United States Patent

[11] 3,618,623

| [72] | Inventor | Premakaran Boaz<br>Allen Park, Mich. |
|---|---|---|
| [21] | Appl. No. | 817,134 |
| [22] | Filed | Apr. 17, 1969 |
| [45] | Patented | Nov. 9, 1971 |
| [73] | Assignee | Ford Motor Company<br>Dearborn, Mich. |

[54] METHOD FOR CONTROLLING THE RATE OF FLOW OF MOLTEN GLASS FROM A CHANNEL
1 Claim, 4 Drawing Figs.

[52] U.S. Cl. .................................................. 137/1,
65/99 A, 65/347
[51] Int. Cl. ................................................. C03b 5/26
[50] Field of Search ....................................... 65/90, 339,
340, 345, 346, 347, 99 A; 222/537, 564; 137/1

[56] References Cited
UNITED STATES PATENTS

| 1,002,375 | 9/1911 | Dixon | 65/340 |
| 2,677,003 | 4/1954 | Arbeit et al. | 65/346 |
| 3,321,289 | 5/1967 | Touvay | 65/340 |

Primary Examiner—S. Leon Bashore
Assistant Examiner—J. B. Hardaway
Attorneys—John R. Faulkner and William E. Johnson ABSTRACT: A liquid is delivered to a channel. The channel contains a baffle extending thereacross at a position below the top surface of the liquid but spaced from the bottom of the channel. By varying the submerged position of the baffle in the liquid with respect to the bottom of the channel, the rate of flow of the liquid through the channel is controlled. A prescribed quantity of liquid may be delivered from the channel by positioning the baffle at a prescribed, submerged position within the liquid flowing through the channel.

PATENTED NOV 9 1971
3,618,623
SHEET 1 OF 2
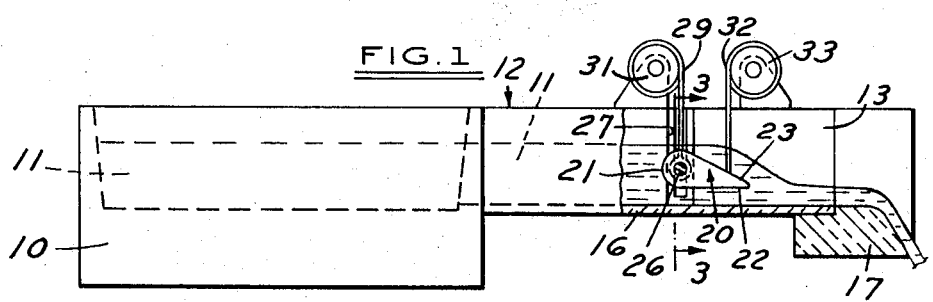
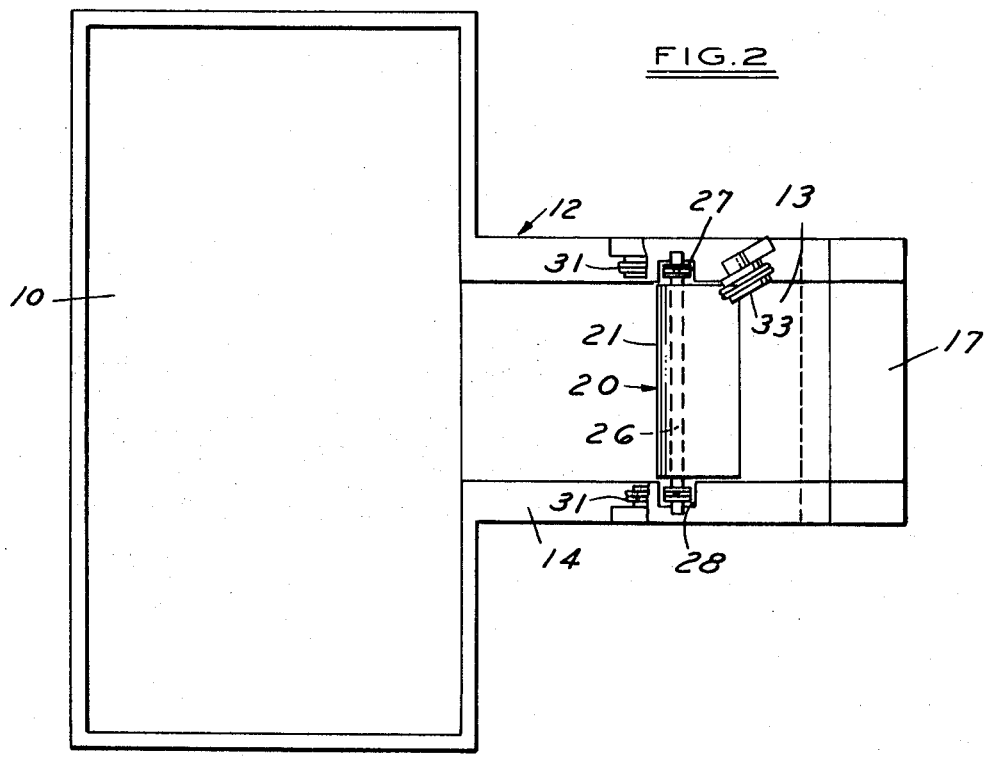
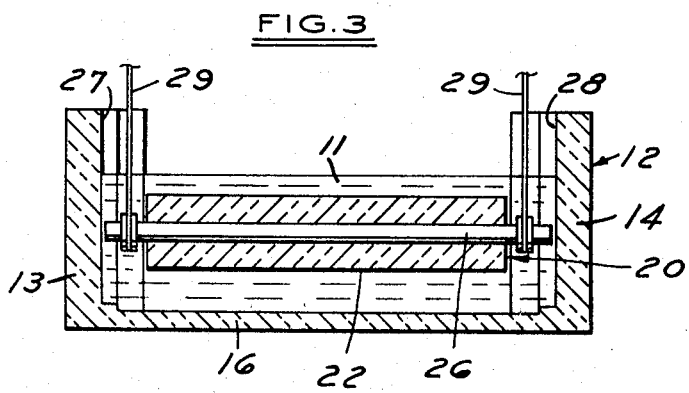
INVENTOR
PREMAKARAN T. BOAZ
BY John R. Faulkner
William E. Johnson
ATTORNEYS

3,618,623

METHOD FOR CONTROLLING THE RATE OF FLOW OF MOLTEN GLASS FROM A CHANNEL

BACKGROUND OF THE INVENTION

Present-day practice for delivering molten glass from a glass-melting chamber to a glass-processing chamber employs a channel and a baffle or tweel. The bottom of the baffle or tweel dips into the glass surface from the top of the channel to control the rate of flow of glass therepast. The dipping of the control baffle or tweel into the top surface of the glass may cause some problems in that the glass which flows pass the tweel may retain indentations therein from an uneven surface of the tweel. Another problem encountered with a standard tweel construction is that foreign materials in the atmosphere around the tweel react with oxygen available and then deposit on the face of the tweel. This material runs down the face of the tweel and is subsequently transferred as a contaminant onto the top surface of the molten glass as it flows therepast.

SUMMARY OF THE INVENTION

Because of the problems encountered with the use of a conventional tweel or control baffle for delivering glass from a glass-melting tank to a glass processing unit, a delivery method has been developed employing a submerged tweel or baffle for controlling the rate of flow from the flow channel.

In detail, the method of delivering a viscous liquid without disturbing the top surface thereof in accordance with the teaching of this invention is as follows. The liquid is delivered to a channel defined by both sidewalls and a bottom wall. The amount of liquid delivered to the channel determines the total cross-sectional area of the liquid flowing through the channel. A baffle or tweel is positioned within the liquid at a position which is submerged below the top surface of the liquid but not in contact with the bottom wall. The baffle has a width approximating the width of the channel and a height less than the height of the liquid in the channel. The baffle is positioned in the liquid so that a portion of the liquid flows under the baffle while another portion of the liquid flows over the baffle. The relative position of the baffle with respect to the bottom wall of the channel is adjusted to control the rate of flow of the liquid through the channel. More particularly, different relative positions of the baffle with respect to the bottom surface of the channel permit varying, controlled amounts of liquid to flow through the channel. Since the baffle is submerged within the stream of liquid flowing through the channel, the top surface of the liquid is not disturbed in any manner thereby.

BRIEF DESCRIPTION OF THE DRAWINGS

FIG. 1 is an elevational view, partly in cross section, showing a delivery system for utilization in the practice of the method of this invention.

FIG. 2 is a plan view of the system shown in FIG. 1.

FIG. 3 is a view, in cross section, taken along line 3—3 of FIG. 1 showing details of the delivery system.

DESCRIPTION OF THE PREFERRED EMBODIMENT

Figure 4:
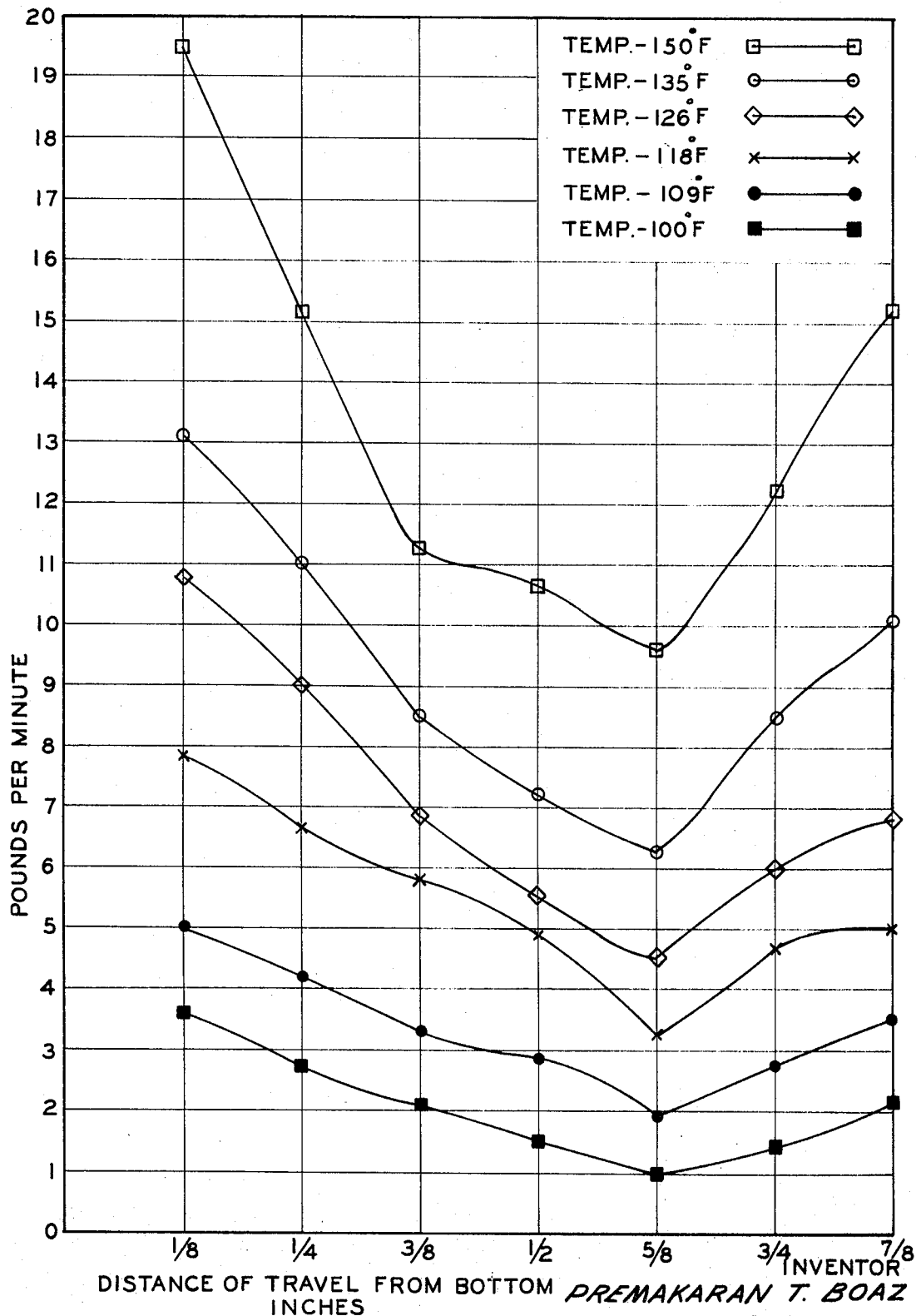
FIG. 4 is a graph showing the results obtained during one test operation of the system in accordance with the teachings of the method of this invention.

The method of this invention has been developed for delivering a viscous liquid, such as glass, to a processing apparatus in such a manner that the liquid has a smooth, undisturbed top surface. The method of the invention employs a submerged tweel or baffle positioned below the top surface of the viscous liquid flowing through a delivery channel. The position of the submerged tweel or baffle within the channel relative to the bottom of the channel controls the amount of liquid flowing through the channel. The method of this invention has been carried out by use of a delivery system such as shown in FIGS. 1-3.

With reference to FIG. 1, there is shown generally therein a system for delivering a viscous liquid in accordance with the teachings of the method of this invention. The delivery system has a large mixing and refining tank 10 in which the viscous liquid 11 is mixed and brought to a uniform temperature. The liquid is delivered from the tank to a canal or channel, generally identified by the numeral 12. The channel 12 has sidewall 13 and 14 and a bottom wall 16. The leading portions of the bottom wall and sidewalls terminate in a spout 17 which delivers the liquid to other processing apparatus. For example, if the molten liquid is glass, the spout may deliver the glass to a chamber for processing the glass into flat sheet glass by a float process.

A baffle or tweel, generally identified by the numeral 20, is submerged in the liquid 11 at a position approximately half way along the channel 12. The baffle 20 has a surface 21 in the form of a half cylinder extending across the width of the channel between the sidewalls. The lower portion of the surface 21 terminates in a planer surface 22 (see FIG. 1) which extends in a direction generally parallel to the bottom wall 16 of the channel. The baffle also has a second planer surface 23 which extends from the surface 21 downwardly at an incline toward and is eventually connected to the planer surface 22 (see FIG. 1).

As best seen in FIGS. 1 and 3, the baffle member 20 is supported on a member 26. The member 26 is received at opposite ends in slots 27 and 28 associated respectively with the sidewalls 13 and 14. An adjusting wire 29 is connected to each side of the support member 26 and, in turn, is directed over an associated pulley 31, one pulley being seen in FIG. 1, to permit up and down adjustment of the baffle within the channel. There is also provided at the forward end of the channel a second adjusting wire 32 and its associated pulley 33 which permits further adjustment of the baffle within the channel so that the planer surface 22 of the baffle may be positioned in a proper attitude with respect to the bottom wall of the channel. Solid adjustable rods may be utilized in place of the wires if desired. This would be of particular value if the baffle was less dense than the liquid flowing therepast.

Having described the components of the delivery system, the utilization thereof to practice the method of this invention in conjunction with polybutane (No. 32) fluid will be described. This fluid has the following viscosity as measured in poise at the various temperatures: 100° F.–270 poise; 109° F.–180 poise; 118° F.–140 poise; 126° F.–120 poise; 135° F.–85 poise; and 150° F.–40 poise. The test delivery system permitted a depth of 2 inches of liquid 11 at the point at which the liquid left the mixing and refining tank 10. The width of the bottom wall 16 of the channel 12 was approximately 10 inches and the length of the channel was approximately 12 inches from the melting tank 10 to the delivery spout 17. The half cylinder surface 21 of the baffle member 20 has a radius of one-half inch and the length of the planer surface 22 was approximately 2 inches. By utilization of such a construction for the baffle or tweel 20, approximately 50 percent of the available cross section for the liquid flow was blocked. The other 50 percent of the available flow area for the liquid was divided between a flow area over the second planer surface 23 and a flow area past the first planer surface 22 in accordance with the exact position of the baffle member 20 with respect to the bottom wall 16 of the channel.

Reference is now made to FIG. 4 which graphically depicts the variation in flow rate of the delivery system. The flow is measured by the amount of material delivered from spout 17 as a function of the position of the planer surface 22 of the baffle with respect to the bottom wall 16 of the channel 12. It will be noted that a positive control is established over the total amount of material flowing through the delivery system by the particular placement of the submerged tweel or baffle. Also, with a decrease in the viscosity of the liquid, the amount of liquid flowing through the delivery system increases but in all cases, the minimum amount of liquid through the channel comes when the submerged tweel is positioned at approximately the same position.

I claim:

1. A method for delivering a controlled flow of a viscous liquid from a channel with the top surface of the liquid being undisturbed during both its flow through and its delivery from the channel, the channel being defined by a bottom wall and sidewalls, which method comprises the steps of:

flowing a quantity of the viscous liquid into the channel to provide a depth of the viscous liquid in an initial portion of the channel;

submerging within the liquid in the channel a baffle which extends between the sidewalls of the channel, the baffle having a primary surface in the form of a half cylinder occupying approximately 50 percent of the cross-sectional area of the liquid flowing through the channel, said primary surface facing against the direction of flow of the liquid and having a width approximately equal to the width of the channel, said baffle also having a planer surface extending from the bottom of said primary surface for a distance along the length of the channel in the direction of the flow of the liquid through the channel, said baffle also having another planer surface extending from the top of said principal surface at an angle inclined downwardly toward the other planer surface;

flowing a portion of the liquid over the top of said primary surface of said submerged baffle in a first flow area between the top of said baffle and the top of the liquid in the channel;

flowing a portion of the viscous liquid under said primary surface of said baffle in a second flow area between the bottom of said baffle and the bottom wall of the channel;

positioning said baffle at different positions spaced from the bottom of the channel while maintaining said baffle in its submerged condition with its primary surface still facing the direction of flow of the viscous fluid so that the flow area in both the first flow area and the second flow area are changed, this change in the two flow areas controlling the total amount of the liquid which may pass through the channel in the two flow areas whereby different amounts of the viscous liquid are delivered from the channel depending on the position of said baffle.

* * * * *